United States Patent [19]

Ohdate

[11] 4,004,868

[45] Jan. 25, 1977

[54] INJECTION MOLD FOR LAMINATED ARTICLE

[75] Inventor: Keiki Ohdate, Yokohama, Japan

[73] Assignee: Nissan Motor Co., Ltd., Japan

[22] Filed: Sept. 30, 1975

[21] Appl. No.: 618,229

[30] Foreign Application Priority Data

Oct. 1, 1974  Japan .............................. 49-112298
Oct. 1, 1974  Japan .............................. 49-112299

[52] U.S. Cl. .............................. 425/130; 425/120; 425/248
[51] Int. Cl.² .......................................... B29F 1/05
[58] Field of Search ........... 425/120, 130, 112, 248

[56] References Cited

UNITED STATES PATENTS

| | | | |
|---|---|---|---|
| 3,315,317 | 4/1967 | Winkler | 425/130 X |
| 3,389,198 | 6/1968 | Taber | 425/4 R |
| 3,751,200 | 8/1973 | Borisuck et al. | 425/120 X |
| 3,809,733 | 5/1974 | Sandiford et al. | 425/120 X |

*Primary Examiner*—Richard B. Lazarus
*Assistant Examiner*—W. R. Briggs
*Attorney, Agent, or Firm*—Robert E. Burns; Emmanuel J. Lobato; Bruce L. Adams

[57] ABSTRACT

To form a laminated plastic article having at least one thermoset layer, a first resin is injected into a mold from a first nozzle and solidified as usual. Then the dies are separated by a predetermined distance to create an additional cavity for a second resin layer on the solidified resin and at the same time provide a fluid passage, which connects the cavity to a second nozzle and is defined and sealed by opposite faces of the dies at their particularly shaped portions. The passage is unsealed by thoroughly separating the dies after injection of a second resin therethrough and solidification of the resin.

5 Claims, 13 Drawing Figures

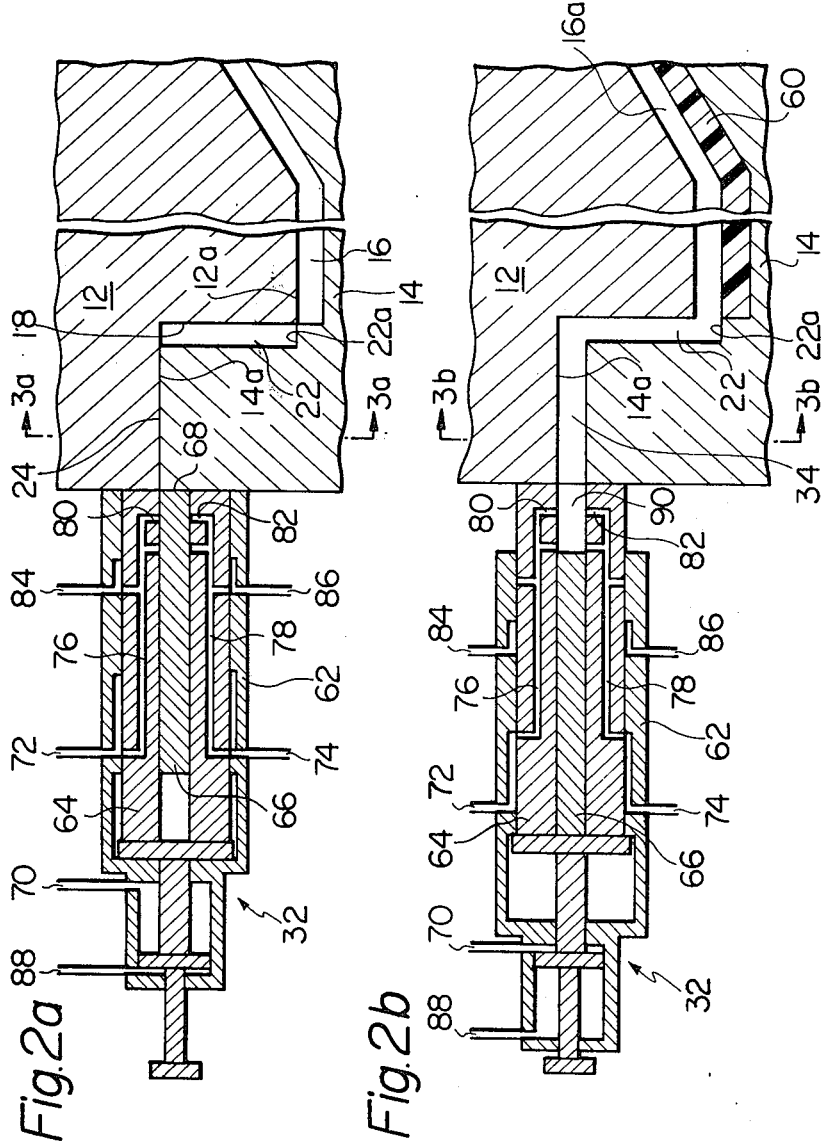

INJECTION MOLD FOR LAMINATED ARTICLE

This invention relates to injection molding of plastics, and more particularly to an injection molding method for the production of a laminated plastic article consisting of a layer of a thermosetting resin and another layer of either a different thermosetting or a thermoplastic resin and a mold for performing the same.

A large variety of shaped articles of laminated plastic which are made up of two layers of different plastic materials are in practical use and/or under development in various fields because of their versatileness in utility and/or ornamental value. For example, a laminated plastic article having a top side layer of either a plasticized or a foamed polyurethane and a back side layer of either a rigid polyurethane or ABS resin (acrylonitrile-butadiene-styrene resin) exhibits high physical strength and at the same time feels soft to the touch.

In most cases, injection molding is considered the most advantageous method for the production of shaped articles of laminated plastic similarly to the production of shaped articles of a single plastic material. When at least one layer of the shaped and laminated article is of a thermosetting resin as exemplified by polyurethane, however, it has been impossible to produce the article by injection molding with a single mold as will be explained below.

Suppose that injection molding is employed for fabricating a laminated article having a layer of a thermosetting resin and another of a thermoplastic resin by the use of a mold provided with a single sprue which is communicable with either of two nozzles via a switching valve and that the thermosetting resin is injected into the mold firstly. The mold is of course of a type capable of forming therein an additional cavity adjacent the resin filling in the initially provided cavity by opening the mold partly. If the termoplastic resin is injected into the same mold before the thermosetting resin in the mold solidifies completely, it is necessary that the thermosetting and the thermoplastic resins are solidified simultaneously after the second shot. Since the former resin needs heating for solidification while the latter cooling, it is practically impossible to achieve simultaneous solidification of the two resins. If the solidification of the initially injected thermosetting resin is accomplished prior to the second shot, it is almost impossible to force the thermoplastic resin to flow into the additional cavity since the connecting passages, i.e., the sprue, gate and runners are choked with the solidified resin. The situation remains practically unchanged even if the thermoplastic resin is injected into the mold firstly.

The difficulties are not overcome even by the use of a modified mold which is provided with two sprues assigned for the thermosetting and thermoplastic resins, respectively. The supplemented sprue is hardly of use due to blockage with the first injected and solidified resin.

The second shot is obstructed even when the injection molding is for the production of a laminated article consisting of two layers of two different kinds of thermosetting resins so long as the second shot is carried out after solidification of the firstly injected resin. When the second thermosetting resin is injected into the mold before the solidification of the first resin, simultaneous solidification of the two resins in the mold may be possible, but there is a good chance that the two kinds of resins will mix with each other in the mold. Besides, it is feared that the collision of the flow of the second resin with the first resin in the cavity may cause unwanted variations in the respective thicknesses of the two layers. Accordingly, the molded article is far from the originally intended quality even though the molded article appears superficially to be formed correctly. Needless to say, it has been utterly impossible to produce a shaped and laminated article having three or more layers by injection molding with a single mold so long as at least one of the layers is of a thermosetting resin.

A typically conventional method for the fabrication of a shaped and laminated article of the described type includes the steps of shaping the individual layers separately and joining the shaped layers with an adhesive. In another method, either a substratum layer or a framework member alone is molded, and outer and/or intermediate resin layers are formed thereon by vacuum shaping and/or casting followed by foaming. These conventional fabrication methods are expensive and consume much time and labor.

It is an object of the present invention to provide an improved injection molding method for the production of a laminated plastic article having at least one layer of a thermosetting resin.

It is another object of the invention to provide an improved mold for performing an injection molding method according to the invention.

In an injection molding method according to the present invention, a fluidized first resin which may be either a thermoset or a thermoplast is injected from a first nozzle into a sealed cavity formed in a mold, which has a stationary die plate and a movable die plate arranged to face each other and form the cavity therebetween, and solidified in the cavity. The movable die plate is then parted from the stationary die plate by a predetermined distance, so that a space is formed between the solidified resin in the cavity and the stationary die plate. At the same time, a passage is formed in the mold and provids fluid communication between the aforementioned space and a second nozzle. The passage is defined by opposite end faces of the stationary and movable die plates and exposed to the atmosphere over the entire length thereof when the mold is fully opened. A fluidized second resin which also may be either a thermoset or a thermoplast is injected into the aforementioned spaced from a second nozzle through the passage.

A mold according to the invention for use in the above method comprises: a stationary die plate, a movable die plate which is placed on the stationary die plate in such an arrangement that the contacted end faces of the two die plates are locally spaced from each other to form a cavity corresponding in shape and dimensions to a first layer of the article to be produced, and a first sprue which is formed in the stationary die plate for providing fluid communication between the cavity and the atmosphere. The mold is constructed and arranged such that the movable die plate can be parted from the stationary die plate by a predetermined distance corresponding to the thickness of a second layer of the article in order to enlarge the thickness of the cavity. In the above respects, the mold is of a known and variable volume cavity type. According to the invention, the mold further comprises a second sprue which is formed in the movable die plate and defined by opposite end faces of the stationary and movable die plates. These opposite end faces are shaped such that the cavity is prevented from communicating with the atmosphere through the second sprue when the stationary and movable die plates are in full contact, but is allowed to communicate with the atmosphere through the second sprue when the movable die plate is parted from the stationary die plate by a predetermined distance corresponding to the thickness of the second layer of the article.

Other features and advantages of the invention will become apparent from the following detailed description of preferred embodiments thereof with reference to the accompanying drawings, in which:

FIG. 2a is a schematic and partially enlarged view of the same mold in the same section and shows a state wherein the movable die plate of the mold is kept in close contact with the stationary die plate;

FIG. 2b is a same view but shows another state, wherein the movable die plate is half-parted from the stationary die plate;

Figure 3A:
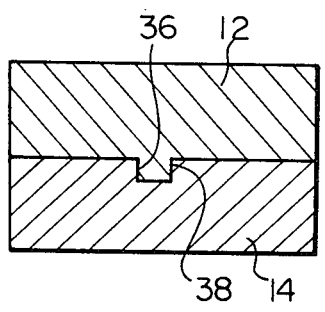
Figure 3B:
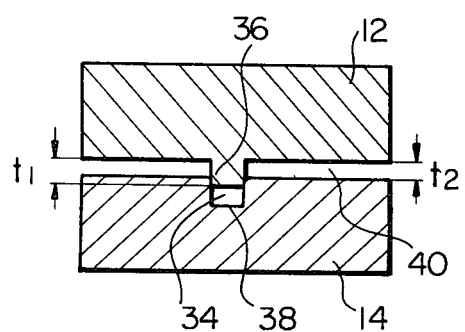
Figure 4A:
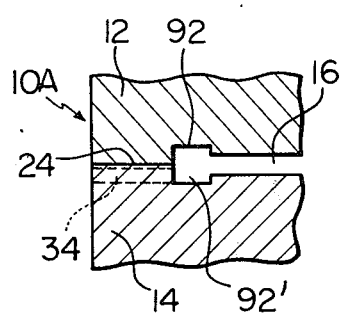
Figure 4B:
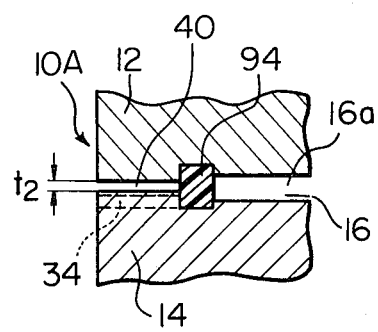
Figure 5A:
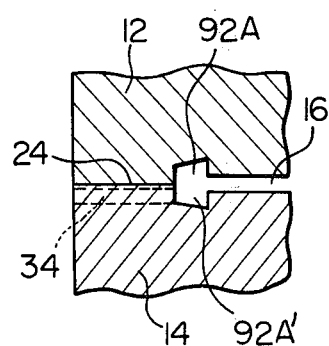
Figure 5B:
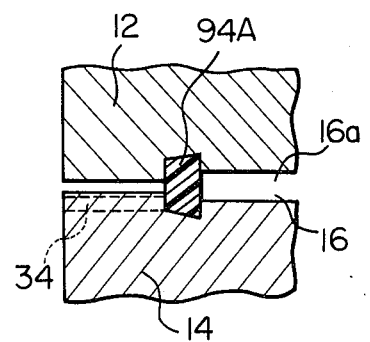
Figure 6A:
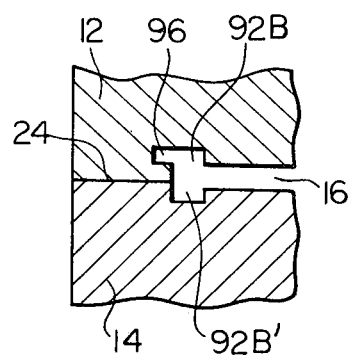
Figure 6B:
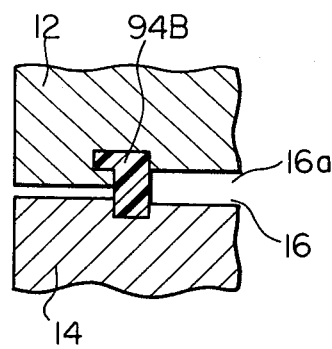
Figure 7A:
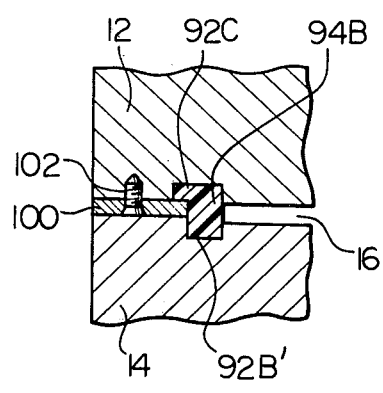
Figure 7B:
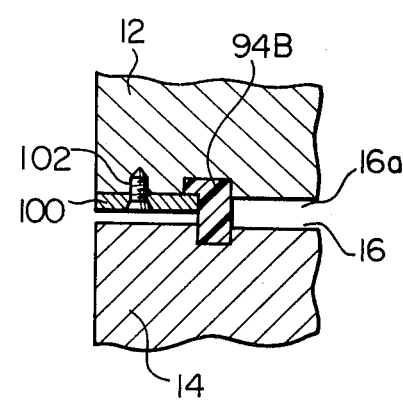

FIGS. 3a and 3b are schematic sectional views taken along the lines 3a — 3a in FIG. 2a and 3a — 3a in FIG. 2b, respectively;

FIGS. 4a and 4b are fragmentary sketches of a side elevation of another embodiment of the invention and show a packing member placed in a groove formed around the cavity in the mold in the states similar to FIGS. 2a and 2b, respectively;

FIGS. 5a, 5b and 6a, 6b are similar sketches showing two further modifications of the packing member as well as the groove, respectively; and FIGS. 7a and 7b are similar sketches showing the same packing member as FIG. 6b placed in a modified groove.

Figure 1:
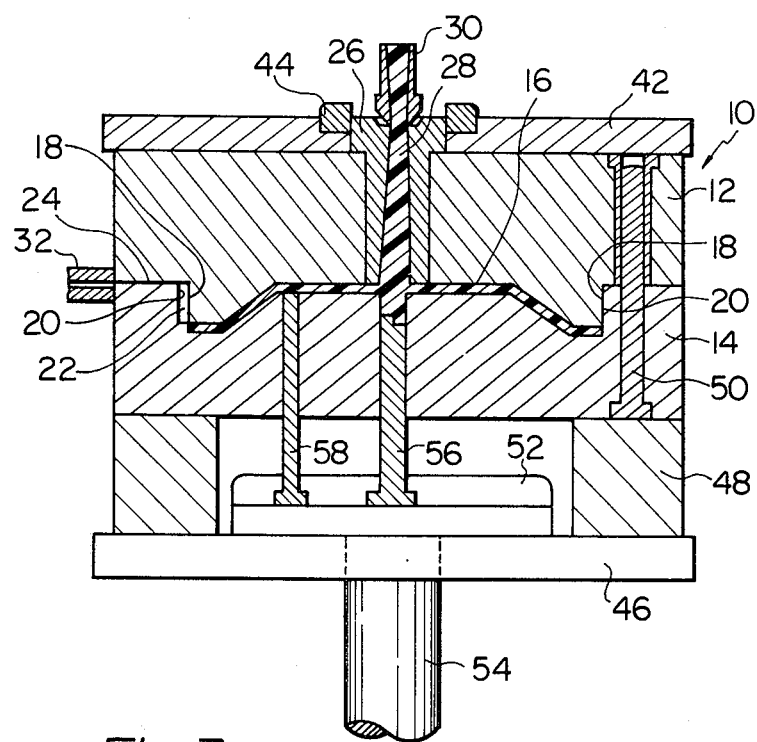
FIG. 1 is a sectional side elevation of a mold according to the invention.

FIG. 1 shows a mold 10, usually metallic, of the direct gate type according to the invention by way of example. This mold 10 has a stationary die plate 12 which is commonly called cavity plate and a movable die plate or core plate 14 assembled together to form a molding cavity 16 therebetween. As is usual, the stationary die plate 12 has a projection at its end region to form a peripheral slide contact surface 18, and the movable die plate 14 has a recess or dent to receive the projection slidably therein. The contact surface 18 of the projection is kept in close contact with a peripheral contact surface 20 of the recess over the entire peripheries except for a region where a vertical groove 22 is formed as described hereinafter. The contact surfaces 18 and 20 are conjoined with a parting plane 24 in which lie the outermost regions of the opposite and contacted end faces of the respective die plates 12 and 14.

A bushing 26 is embedded in the stationary die plate 12 at the middle thereof to form therein a first sprue 28 for allowing injection of a fluidized resin from a first nozzle 30 into the cavity 16. Both the first nozzle 30 and sprue 28 are unchanged from those which are used in conventional injection molding apparatus. The gate and runners in the die plate 12 are omitted from the illustration for simplification. The mold 10 is constructed and arranged such that the volume or thickness of the cavity 16 can be enlarged by moving the movable die plate 14 by a predetermined distance from the stationary die plate 14 as is practised in conventional molds for molding an expandable plastic. In FIG. 2b, the reference numeral 16a represents a space or an additional cavity formed between the patterned end face 12a of the stationary die plate 12 and the initial cavity 16 by the aforementioned movement of the movable die plate 14.

According to the invention, this mold 10 is designed to engage with a second nozzle 32 which is arranged laterally to the mold 10 at a location on its periphery adjacent the parting plane 24. No fixed sprue is provided specifically in the mold 10 for providing communication between the second nozzle 32 and the cavity 16. The die plates 12 and 14 are shaped locally to form a lateral passage 34 as seen in FIG. 2b when the movable die plate 14 is moved to a position where the additional cavity 16a is realized. The passage 34 communicates with the orifice or exit of the second nozzle 32 and merges into the axial groove or passage 22 at the opposite end. The passage 22 terminates at the non-recessed region of the end face 14a of the movable die plate 14 and, at its opposite or lower end, at a shoulder 22a formed on the recessed face of the movable die plate 14. As seen in FIG. 2a, this shoulder 22a is arranged to prevent the channel 22 from communicating with the cavity 16 when the die plate 14 is positioned so as to contact the stationary die plate 14 along the parting plane 24.

FIG. 3a shows the shape of the passage 34 as viewed from the direction of the second nozzle 32. The stationary die plate 12 has an elongate projection 36 formed on its end face outside the contact surface 18 to extend from the contact surface 18 to the peripheral surface at such a location that the exit of the second nozzle 32 faces the outer end of this projection 36. The movable die plate 14 has an elongate groove 38 extending from the contact surface 20 to the peripheral surface. The groove 38 is shaped and arranged such that the projection 36 fits tightly in the fills completely the groove 38 as shown in FIG. 3a when the die plates 12 and 14 are maintained together along the parting plane 24. when the movable die plate 14 is moved to the new position to form the additional cavity 16a, the groove 38 becomes partly vacant as seen in FIG. 3b. In this state, the projection 36 is still received in the groove 38 tightly by a certain height or thickness sufficient to prevent the vacant portion of the groove 38, i.e., the passage 34, from communicating with the gap 40 extending laterally on both sides of the projection 36 between the two die plates 12 and 14. Accordingly, the height $t_1$ of the projection 36 should be larger than the distance $t_2$ travelled by the die plate 14 to form the additional cavity 16a. The distance $t_2$ is of course the thickness of the additional cavity 16a. The axial or vertical passage 22 is formed by cutting a groove in the contact surface 20 of the movable die plate 14. The cross sectional shape of the passage 22 is preferably unvaried throughout its entire length with a slight taper to give a large cross sectional area at the upper end where the passage 22 joins the lateral passage 34 in order to facilitate the ejection of the molded article. The lower end of the passage 22, i.e., the shoulder 22a, is in the same plane as the extended part of the end face 12a of the stationary die plate 12. Alternatively, the shoulder 22a is in a different plane positioned slightly above the plane of the extended part of the end face 12a by a distance shorter than the aforementioned distance $t_2$. Thus, the passage 22 is isolated from the cavity 16 when the movable die plate 14 is kept in contact with the stationary die plate 12 along the contact plane 24.

In other respects, the mold 10 is constructed in a well known fashion. The stationary die plate 12 is mounted on a top clamping plate 42, and an annular locating member 44 is fixed to the plate 42 around the housing 26. The movable die plate 14 is mounted on a last clamping plate 46 with a spacer 48 inserted therebetween. Guide pins 50 are embedded in the movable die plate 14 and slidably received in bores formed in the stationary die plate 12 at their extended portions in order to facilitate accurate movements of the die plate 14 relatively to the stationary die plate 12. An ejector plate 52 is movably assembled with the support member 46 to face the bottom of the die plate 14, and an ejector rod 54 extending away from the die plate 14 passages through the plate 46. A sprue lock pin 56 is fixed to the ejector plate 52 and extends nearly to the cavity 16 so as to be roughly in alignment with the sprue 28. Also ejection pins 58 are fixed to the ejector plate 52 to terminate at the cavity 16.

An ejection molding method according to the invention is realized by the use of the above described mold 10 for the production of a shaped article consisting of a layer of a thermosetting resin and another layer of either a thermoplastic resin or a different kind of thermosetting resin and performed in the following manner.

Firstly, the mold 10 is completely closed so that the two die plates 12 and 14 meet along the contact plane 24. A fluidized first resin indicated at 60 is injected into the cavity 16 from the first nozzle 30 through the sprue 28. The first resin may be either a thermosetting resin or a thermoplastic resin. As seen from the foregoing description, the first resin 60 is prevented from flowing into the passage 22. Then the first resin 60 in the mold 10 is hardened or solidified either completely or nearly so in a usual manner. Then the movable die plate 14 is moved to a predetermined position by the distance $t_2$. As a result, the solidified first resin 60 in the cavity 16 is pulled by the sprue lock pin 56 and moved together with the die plate 14. Naturally, the space 16a is formed between the upper surface of the first resin 60 in the cavity 16 and the extended part of the end face 12a of the stationary die plate 12 as seen in FIG. 2b. This space 16a which is connected to the exit of the second nozzle 32 through the passages 22 and 34, serves as the additional cavity for a second time injection with this mold 10. In this state, a fluidized second resin (not shown) is injected from the second nozzle 32 into the thus formed additional cavity 16a. A portion of the injected second resin may sometimes enters a narrow space formed between the sprue 28 and the first resin 60 solidified within the sprue 28. Such flow of the second resin, however, is stopped at the first nozzle 30. There may occur mixing of the first and second resins in the first nozzle 30, but the quantity of the resulting resin mixture is quite small. Accordingly, the mixture will not be injected into the cavity 16 during a next shot but will accumulate in a space between the cavity 16 and the end face of the sprue lock pin 56, so that the occurrence of such mixing of the resins in the first nozzle 30 is not of any substantial consequence to the injection molding operations. After the second resin in the mold 10 is solidified in a usual manner, the mold 10 is fully opened similarly to the mold opening procedures in the conventional injection molding methods.

The laminated and molded article is pulled away from the stationary die plate 12 by the movement of the sprue lock pin 56 and remains adhered to the movable die plate 14. Then the ejector rod 54 is thrusted towards the movable die plate 14 to cause the ejection pins 58 to protrude into the cavity 16 and part the molded article from the die plate 14. After removal of the molded articles from the mold 10, the ejector rod 54 is pulled back to the initial position and the mold 10 is closed in preparation for a next injection of the first resin from the first nozzle 30.

As seen from the foregoing description, a two-ply laminate product can be molded merely through consecutive injections with a single mold 10. No additional operation such as e.g., adhesive joining is required, so that remarkable reduction in the production cost can be attained by the employment of a method according to the invention.

Various combinations of currently available resins can be used for the two injections according to the invention. For example, the combinations of ABS resin-plasticized polyurethane, polystyrene-plasticized polyurethane and rigid polyurethane-plasticized polyurethane are suitable for molding a variety of articles. A method according to the invention is applicable to any other combination of a fluidizable thermosetting resin and either a different but also fluidizable thermosetting resin or a fluidizable thermoplastic resin only if the two resins in the combination have good mutually adhering properties. When a combination of a thermosetting resin and a thermoplastic resin is used, either the former or the latter may be injected firstly from the first nozzle 30.

A foamable or expandable resin can be employed as either one or both resins in any of the above combinations. When an expandable resin is used as the first resin 60, the mold 10 is designed to allow shifting of the movable die plate 14 to an intermediate position to allow space for expansion of the first resin 60 after injection thereof into the initial cavity 16 in advance of shifting to the position at which the second injection operation from the second nozzle 32 is performed. In this case, the shoulder 22a must be formed so as to prevent the passage 22 from communicating with the space formed above the initial cavity 16 and being filled with the expanded first resin 60 when the movable die plate 14 is shifted to the intermediate position.

The second nozzle 32 for use in combination with the mold 10 according to the invention is required to have a specific construction to avoid solidification of a resin within the nozzle 32. If solidification of the resin occurs in the second nozzle 32, the solidified resin cannot easily be removed from the nozzle 32 because the movable die plate 14 is moved only in directions perpendicular to the axis of the nozzle 32 upon opening of the mold 10. Fortunately, the above requirement for the second nozzle 32 is met by some of available nozzles.

FIGS. 2a and 2b show a schematic longitudinal sectional views of the second nozzle 32 with respect to a nozzle available from Krauss Moffei Co. of West Germany as a preferable example. This nozzle 32 has an outer cylinder 62, an inner cylinder 64 received slidably in the outer cylinder 62. The outer cylinder 62 has a unitary core rod 66 which is slidably received in the inner cylinder 64. The exit 68 of the nozzle 32 is normally closed by the core rod 66 as seen in FIG. 2a. The outer cylinder 62 and the inner cylinder 64 are stepped and flanged, respectively, at their left end sections as illustrated, and a hydraulic pressure is applied to a first oil inlet port 70 when the nozzle 32 is standing by, or in the state of FIG. 2a. A resin inlet port 72 and a curing agent inlet port 74 are formed in the peripheral wall of the outer cylinder 62, and a resin channel 76 and a curing agent channel 78 are formed in the wall of the inner cylinder 64 to open into the interior of the inner cylinder 64 at ports 80 and 82, respectively, located relatively close to the exit 68 of the nozzle 32. Since the ports 80 and 82 are kept closed by the core rod 66 in the state of FIG. 2a, the resin and the curing agent supplied to the channels 76 and 78 are not mixed with each other in the nozzle 32 but are discharged from outlets 84 and 86, respectively. When injection of the resin from this nozzle 32 is intended, the hydraulic pressure is applied to a second oil inlet port 88 to move the outer cylinder 62 (and naturally the core rod 66) leftwards relatively to the inner cylinder 64 as seen in FIG. 2b. As a result, a mixing chamber 90 is formed in the inner cylinder 64 between the right end of the core rod 66 and the exit 68 of the nozzle 32. In this state, the ports 80 and 82 open into the mixing chamber 90 while the return outlets 84 and 86 are isolated from the channels 76 and 78. The resin and the curing agent, therefore, are mixed with each other in the thus formed mixing chamber 90 and discharged from the nozzle 32 through the exit 68. The outer cylinder 62 is returned to the initial position soon after completion of an injection procedure, so that the mixture in the mixing chamber 90 is discharged entirely before solidification occurs.

The mold 10 is constructed such that the additional cavity 16a is formed between the initial cavity 16 and the end face 12a of the stationary die plate 12. In other words, the volume or thickness of the cavity 16 in the mold 10 can be enlarged during a molding operation. Such enlargement of the cavity volume is not specific to the mold 10 according to the invention but is known in conventional molds for molding either an article of an expandable resin or a laminated article of a plurality of thermoplastic resins. In this type of mold, the stationary die plate 12 and the movable die plate 14 are required to fit tightly with each other over substantial areas of the contact surfaces 18 and 20 formed around the cavity 16 to prevent the fluidized resin in the cavity 16 from flowing out of the cavity 16 when the movable die plate 14 is moved relatively to the stationary die plate 12 to enlarge the cavity 16. As is known, the contact surfaces 18 and 20 need high precision machining and surface finishing procedures and accordingly are slow and expensive to produce.

Such inconvenience can be obviated by sealing up the cavity 16 with a packing member of an elastomer inserted tightly into at least one groove formed around and adjacent the cavity 16, in either of the end faces of the stationary and movable die plates 12 and 14 forming the parting plane 24, instead of forming the slide contact surfaces 18 and 20.

In a mold 10A of FIG. 4a, the slide contact surfaces 18 and 20 are eliminated, and the stationary and movable die plates 12 and 14 are kept in contact with each other only over the peripheral regions forming the parting plane 24. An annular packing member 94 of an elastomer is inserted into these grooves 92 and 92' as seen in FIG. 4b which shows the same mold 10A in a state when the movable die plate 14 is parted from the stationary die plate 12 in preparation for the second shot from the second nozzle 32. It will be understood that the packing member 94 is compressed more strongly when the mold 10A is in the fully closed state as shown in FIG. 4a. The elastomeric material of the packing member 94 is required to have excellent elasticity, to be compatible with and insoluble in the resins used in the molding, and to maintain its elasticity even at elevated temperatures to which the packing member 94 is exposed in the molding operations. Among various known elastomers useful for the packing member 94, synthetic rubbers containing a major amount of either a silicone or a mixture of silicone and polytetrafluoroethylene are most preferable. The packing member 94 may be held in the described position in various manners not in accordance with FIGS. 4a and 4b, for example, by forming a stepped section around the cavity 16. It is preferable, however, to form a groove having a cross-sectional shape identical with the cross-sectional shape of the packing member 94. The packing member 94 must have a thickness larger than the sum of the depths of the grooves 92, 92' and the distance $t_2$ of the gap 40 formed between the two die plates 12, 14 in advance of the second shot. The width of the packing member 94 is preferably nearly equal to that of the grooves 92, 92'.

Thus, the packing member 94 is always kept pressed against both the end faces of the stationary and movable die plates 12 and 14 whether the mold 10A is in the state of FIG. 4a for the injection of the first resin or in the state of FIG. 4b for the second shot, so that the fluidized resin in the cavity 16 is prevented from leaking out across the grooves 92, 92'. Since the packing member 94 is in tight contact with the end faces of the bottoms of the grooves 92, 92' due to its elasticity, the grooves 92, 92' need not to be shaped and surface finished so precisely as the slide contact surfaces 18 and 20.

To provide fluid communication between the passage 34 and the additional cavity 16a, the packing member 94 may be cut at a location corresponding to the position of the projection 36 and the groove 38 of FIGS. 3a and 3b. Alternatively, the groove 92' in the movable die plate 14 may be enlarged at a portion facing the inner end of the passage 34.

The grooves 92, 92' and the packing member 94 may have a different cross-sectional shape from the illustration in FIGS. 4a and 4b. In FIGS. 5a and 5b, the grooves 92A and 92A' are tapered in the lateral direction so that the thickness may be largest at the inner side bordering the cavity 16. The packing member 94A also is shaped to have a trapezoidal cross section. This configuration enhances the sealing ability of the packing member 94A because the packing member 94A is pressed strongly against the inner walls of the grooves 92A, 92A'.

In FIGS. 6a and 6b, the groove 92B in the stationary die plate 12 is shaped to have an angled cross-sectional shape so that the groove 92B has a projection extending laterally and outwardly at a section contiguous to the bottom of the groove 92B. The packing member 94B also has the same projection 98. The groove 92B' in the movable die plate 14 is the same as the groove 92' in FIG. 4a in cross section. This configuration features that the packing member 94B remains attached to the stationary die plate 12 when the mold 10A is fully opened. The groove 92B which has an angled or L-shaped cross section may be formed more easily by a method as shown in FIGS. 7a and 7b. The groove 92C is rectangular in cross section with a larger width than the groove 92B' in the movable die plate 14. A retainer plate 100 is placed on the end face of the stationary die plate 12 to surround and partly extend into the groove 92C as far as the outer and upper edge of the groove 92B in the movable die plate 14. The retainer 100 is fixed to the die plate 12 with, e.g., screws 102.

What is claimed is:

1. A mold for the injection molding of a laminated article plastic having a first layer of a first resin and a second layer of a different second resin, the mold comprising:

a stationary die plate;

a movable die plate juxtaposed against said stationary die plate in such an arrangement that the contacted end faces of said stationary and movable die plates are locally spaced from each other to form a cavity corresponding in shape and dimensions to said first layer and that the dimensions of said cavity are enlarged when said movable die plate is parted from said stationary die plate;

a first sprue formed in said stationary die plate for providing fluid communication between said cavity and the atmosphere; and a second sprue formed in said movable die plate, said second sprue being defined by opposite end faces of said stationary and movable die plates, said opposite end faces being shaped such that said cavity is prevented from communicating with the atmosphere through said second sprue when said stationary and movable die plates are in full contact but allowed to communicate with the atmosphere through said second sprue when said movable die plate is parted from said stationary die plate by a predetermined distance corresponding to the thickness of said second layer.

2. A mold as claimed in claim 1, wherein said stationary and movable die plates fit in tightly with each other along slide contact surfaces arranged as part of said contacted end faces to lie generally parallel to the direction of the parting movement of said movable die plate, said second sprue comprising a first groove formed on the slide contact surface of said movable die plate to extend from an end of said cavity to the contacted end face of said movable die plate, and a second groove formed on the contacted end face of said movable die plate and arranged generally perpendicular to said first groove, said second groove providing communication between said first groove and the atmosphere, the contacted end face of said stationary die plate having a projection arranged and shaped such that said projection fits in tightly with and fills in said second groove when said stationary and movable die plates are in full contact, the height of said projection being larger than said predetermined distance.

3. A mold as claimed in claim 1, wherein a third groove is formed in each of the contacted end faces of said stationary and movable die plates to surround and border said cavity, said third groove in one of said contacted end faces being equal in width to and located opposite said third groove in the other end face, said third groove being defined laterally by two parallel walls arranged parallel to said direction of the parting movement of said movable die plate, the mold further comprising a packing member of an elastomeric material received in said third grooves, said packing member having a cross-sectional shape similar to a cross-sectional shape formed by combination of said third grooves, the thickness of said packing member being larger than the sum of said distance and the depths of said third grooves.

4. A mold as claimed in claim 3, wherein the bottom of said third groove is tapered such that the depth of said third groove is largest at the inner end bordering said cavity.

5. A mold as claimed in claim 3, wherein said third groove formed in said stationary die plate has a projection extending laterally and outwardly at a section contiguous to the bottom thereof so that the cross section thereof is L-shaped.

* * * * *